(12) United States Patent
Hui

(10) Patent No.: US 6,359,464 B1
(45) Date of Patent: Mar. 19, 2002

(54) METHOD OF USE WITH A TERMINATOR AND NETWORK

(75) Inventor: David T. Hui, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/583,185

(22) Filed: May 30, 2000

(51) Int. Cl.⁷ .................... H03K 17/16; H03K 19/003
(52) U.S. Cl. ...................... 326/30; 326/26; 326/27; 326/83; 326/86
(58) Field of Search ............... 326/30, 86, 26, 326/27, 83

(56) References Cited

U.S. PATENT DOCUMENTS

| | | | |
|---|---|---|---|
| 4,228,369 A | 10/1980 | Anantha et al. | 307/270 |
| 4,525,830 A | 7/1985 | Cohen et al. | 370/60 |
| 4,748,426 A | 5/1988 | Stewart | 333/22 R |
| 4,989,202 A | 1/1991 | Soto et al. | 370/13 |
| 5,013,940 A * | 5/1991 | Ansel | 326/27 |
| 5,204,860 A | 4/1993 | Sparks | 370/110.1 |
| 5,206,544 A * | 4/1993 | Chen et al. | 326/30 |
| 5,387,131 A | 2/1995 | Foreman et al. | 439/620 |
| 5,493,657 A | 2/1996 | Van Brunt et al. | 395/308 |
| 5,523,704 A | 6/1996 | So | 326/30 |
| 5,675,580 A | 10/1997 | Lyon et al. | 370/250 |
| 5,729,824 A | 3/1998 | O'Neill et al. | 455/3.1 |
| 5,850,387 A | 12/1998 | Lyon et al. | 370/250 |
| 5,869,984 A * | 2/1999 | Eto | 326/86 |
| 5,917,827 A | 6/1999 | Cantwell | 370/466 |
| 5,977,797 A | 11/1999 | Gasparik | 326/86 |
| 6,054,876 A * | 4/2000 | Horie et al. | 326/83 |

FOREIGN PATENT DOCUMENTS

JP          405235737 A  *  9/1993  .................. 326/27

* cited by examiner

Primary Examiner—Michael Tokar
Assistant Examiner—Steven S. Park
(74) Attorney, Agent, or Firm—Lynn L. Augspurger

(57) ABSTRACT

A terminator circuit for connection to a network can be fabricated and used within CMOS-SOI (complementary metal oxide semiconductor—silicon on insulator) for carrying small logic level signals for connecting data from a network's first circuit to a network's second circuit in which a network's input terminal connects a terminator circuit to the network's second circuit to act as a terminator on the data line passing data from said first circuit to said second circuit. The terminator circuit has a reference circuit coupled to a terminal circuit. The reference circuit has SOI devices back to back source coupled CMOS-SOI devices to each other for a tuned center reference voltage node, with their bodies connect to upper and lower level power supplies respectively. An upper level power source is connected to one side of the reference voltage node and a lower reference voltage power source is connected to the other side of the reference voltage node. The voltage level above the common tuned reference voltage and a lower level voltage is supplied to the terminator's corresponding input terminal circuit control nfet and pfet mirror devices whose bodies are also connected respectively to lower and upper level supply power to control each of their turn on voltages. Resistors of the reference path establish the swing voltage of the terminator as being that approximating an ideal 50 ohm split resistor terminator.

14 Claims, 4 Drawing Sheets

US 6,359,464 B1

METHOD OF USE WITH A TERMINATOR AND NETWORK

FIELD OF THE INVENTION

This invention relates to terminators which are applicable to metal oxide semiconductor on insulator (MOS-soi) with triple wells integrated circuit technology and which are particularly useful for terminator networks and particularly to the method for use therewith.

RELATED APPLICATIONS

This application is related to the following concurrently filed application(s):

U.S. Ser. No. 09/580,290, filed May 30, 2000, entitled: CMOS Small Signal Terminator and Network, naming David T. Hui, inventor; and U.S. Ser. No. 09/593,187, filed May 30, 2000, entitled: SOI Small Signal Terminator and Network, naming David T. Hui, inventor; and U.S. Ser. No. 09/580,942, filed May 30, 2000, entitled: SOI Small Signal Switchable Adjustable Terminated Hysteresis Receiver, naming David T. Hui, inventor; and U.S. Ser. No. 09/580,289, filed May 30, 2000, entitled: CMOS Small Signal Terminated Receiver, naming David T. Hui, inventor; and U.S. Ser. No. 09/583,055, filed May 30, 2000, entitled: CMOS Small Signal Switchable Terminator Network, naming David T. Hui, inventor; and U.S. Ser. No. 09/583,186, filed May 30, 2000, entitled: CMOS Small Signal Switchable Adjustable Impedance Terminator Network, naming David T. Hui, inventor; and U.S. Ser. No. 09/580,789, filed May 30, 2000, entitled: CMOS Small Signal Switchable and Adjustable Terminator Network, naming David T. Hui, inventor; and U.S. Ser. No. 09/583,188, filed May 30, 2000, entitled: CMOS Small Signal Switchable Impedance and Voltage Adjustable Terminator Network, naming David T. Hui, inventor; and U.S. Ser. No. 09/580,805, filed May 30, 2000, entitled: CMOS Small Signal Switchable Impedance and Voltage Adjustable Terminator Network and Receiver Integration, naming David T. Hui, inventor; and U.S. Ser. No. 09/580,680, filed May 30, 2000, entitled: CMOS Small Signal Switchable Impedance and Voltage Adjustable Terminator with Hysteresis Receiver Network, naming David T. Hui, inventor; And U.S. Ser. No. 09/580,802, filed May 30, 2000, entitled: CMOS Small Signal Terminated Hysteresis Receiver, naming David T. Hui, inventor; and U.S. Ser. No. 09/580,943, filed May 30, 2000, entitled: SOI Small Singal Terminated Receiver, naming David T. Hui, inventor.

This related application(s) and the present application are owned by one and the same assignee, International Business Machines Corporation of Armonk, N.Y.

The descriptions set forth in these co-pending applications are hereby incorporated into the present application by this reference.

TRADEMARKS

S/390 and IBM are registered trademarks of International Business Machines Corporation, Armonk, N.Y., U.S.A.. Other names may be registered trademarks or product names of International Business Machines Corporation or other companies.

BACKGROUND

For signal interfaces between devices terminators have been used, as described for instance in U.S. Pat. No. 4,748,426: entitled "Active termination circuit for computer interface use", granted May 31, 1988 to Alexander Stewart for Rodime PLC, in an active termination circuit for a computer interface for reducing line reflection of logic signals. Such terminators have used a first and second resistor combination to permanently connect to a signal line that couples a plurality of peripheral devices to one another. The other ends of the first and second resistors are connected through a device to a positive voltage supply line and to logic ground, respectively. When termination of multiple devices was required, a plurality of resistor combinations were provided but on/off control of the switch in this example was achieved by one control that is located remote from the termination circuit systems. Integrated circuit interconnection structures have also used precision terminating resistors, as illustrated by U.S. Pat. No. 4,228,369, granted in October, 1980 to Anantha et al. for IBM.

As will be illustrated for chip interconnection, when resistor terminators are used in thin film semiconductor integrated circuits such as those used in metal oxide semiconductors (e.g.CMOS) today, they create hot spots which cannot be adequately cooled, so such resistor terminator circuits which create hot spots cannot be used in metal oxide semiconductor applications to provide terminators for chip to chip connections on chips using IBM's new sub-micron MOS (CMOS) technologies where because of the high currents used in these networks it is difficult or impossible to meet all the cooling and reliability requirements required for commercial performance. It has become necessary to invent a solution to interfacing devices which can be used in such environments on chips, and used for terminators in networks of chips and devices where there is a need to transmit digital data therebetween without overshoot and undershoot in signal transmission between the chips and devices or systems. These connections need to operate at a faster speed, accommodating data rate speeds ranging into hundreds of Mhz and Ghz.

The creation of a terminator which particularly may be fabricated for high speed metal oxide semiconductor on insulator (MOS-soi) applications with triple wells in integrated circuits is needed.

SUMMARY OF THE INVENTION

This invention creates a terminator for a terminator network which is useful for fast transmission of digital data between devices, in chips and systems, substantially eliminating or greatly reducing overshoot and undershoot in signal transmission between devices, in chips and systems, in serial links and data buses, and which can be fabricated for high speed metal oxide semiconductor on insulator (MOS-soi) with triple wells for these integrated circuit applications. Construction of resistor terminators on a chip using sub-micron MOS on SOI is especially difficult because of the high currents in the networks, and yet the illustrated embodiment of the invention has achieved a terminator solution for connecting devices meeting all the cooling and reliability requirements of current technology while minimizing ringing and similar noise problems as well as providing electrostatic discharge (ESD) protection, in bulk applications, and particularly in high speed metal oxide semiconductor—silicon on insulator (MOS-soi) integrated circuit applications and mixed vender technology interface communication applications. As demand for fast data transmission has pushed the data rate into hundreds of Mhz and Ghz, the terminator described reduces the signal swing between networked elements so that the signal reaches its desired digital ones or zeros voltage levels faster with lower power and with less noise generation.

In accordance with the invention, the terminator of the preferred embodiment can be used in a network adapted to be implemented in MOS technology with the terminator matching the characteristic impedance of the network transmission line. It provides a fast terminator network suitable for connections having small signal swings and which may also be used in a mixed technologies communication.

The present invention provides a terminator network which has low current flow and low power consumption.

Still another improvement provided by the present invention is that the terminator network provides ESD protection at the input of an attached circuit.

These and other improvements are set forth in the following detailed description. For a better understanding of the invention with advantages and features, refer to the description and to the drawings.

Our detailed description explains the preferred embodiments of our invention, together with advantages and features, by way of example with reference to the drawings.

DETAILED DESCRIPTION OF THE INVENTION

Figure 1:
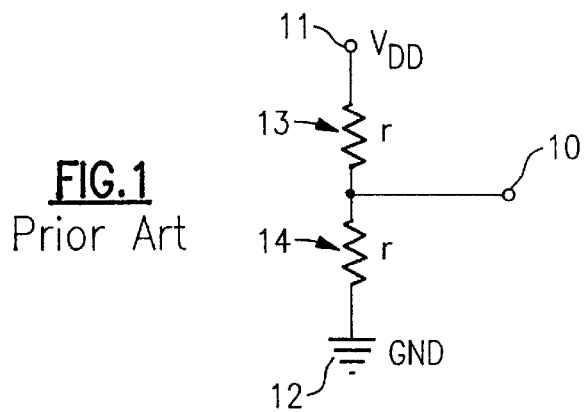
FIG. 1 illustrates a split resistive termination network such as used before there became a need to solve the small signal application for MOS and CMOS-SOI applications needing a terminator network.

Split resistor terminators were used in the prior art as shown in FIG. 1. Where resistor 13 is connected to node 11 to the upper power supply VDD and the other end of resistor 13 is connected to the node 10 and is also connected in series to resistor 14. The other end of resistor 14 is then connected to node 12 to the lower power supply VSS. The value of the resistors are set so that node 10 has a bias voltage equal to the center of the in coming signal swing and the parallel combination of the resistors matches the characteristic impedance Z0 of the transmission line that it is connected to, so that no reflections will occur and a clean signal can be obtained. However, these resistor terminators cannot be used because of the significant power that is dissipated in them in MOS technologies. These resistor terminators are not suitable for use on chips using the new sub-micron MOS technologies because of the high currents in the network makes it impossible to meet cooling needs and reliability requirements.

In describing the preferred embodiment of the present invention in connection with the use of high speed metal oxide semiconductor and in particular, the invention is suitable for MOS silicon on insulator (MOS-soi) integrated circuit applications and mixed vender technology interface applications. The new achievements will be explained with reference to FIG. 2 to FIG. 6 of the drawings.

Figure 2:
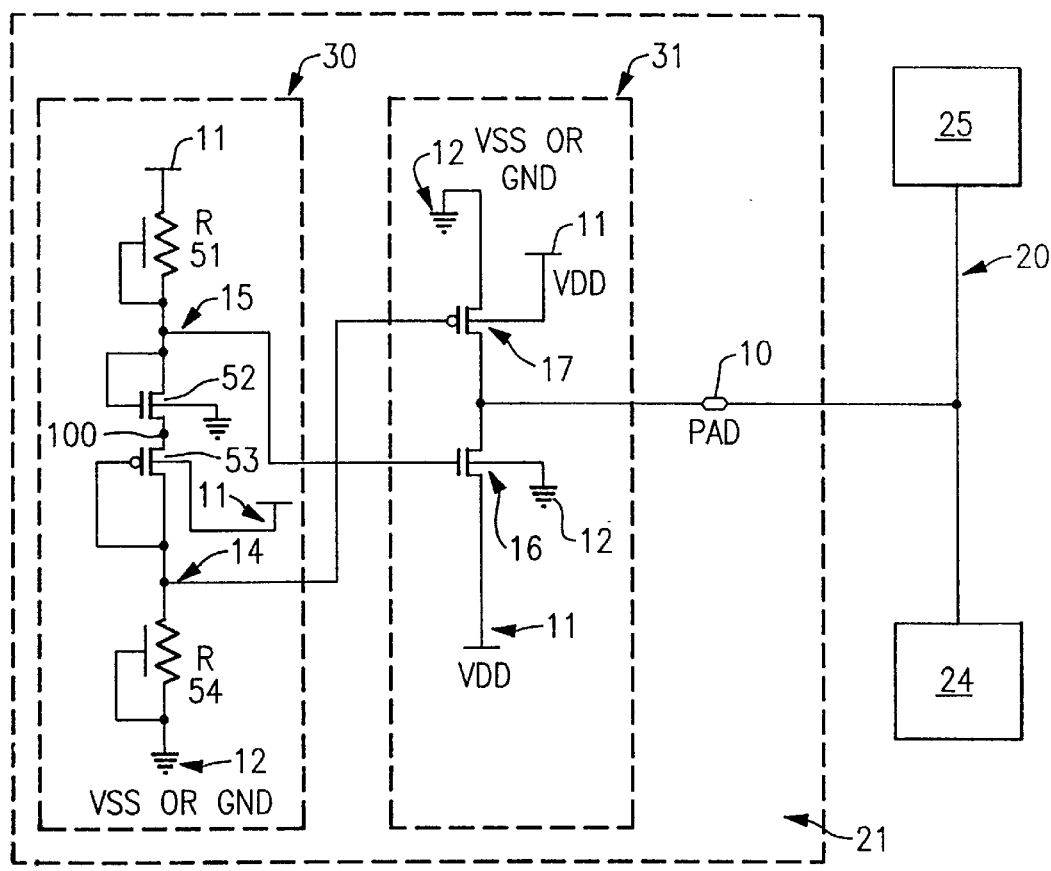
FIG. 2 illustrates the terminator used for a small signal terminator network for CMOS-SOI (complementary metal oxide semiconductor—silicon on insulator) in accordance with the preferred embodiment of the invention.

FIG. 2 shows a network 20 carrying signals from a first driving circuit 25 to a second (driven input) circuit 24. A network input terminal 10 connects the terminator circuit 21 to the second driven input circuit 24. Thus, like the prior resistive terminator network, the terminator herein provides a terminator circuit for connection to a network carrying signals from a network's first circuit to a network's second circuit in which a network's input terminal connects a terminator circuit to the network's second circuit to act as a terminator on the data line passing data from said first circuit to said second circuit. However, here it should be understood that the terminator of the preferred CMOS small signal terminator network which is constructed according to the present invention approximates an ideal 50 ohm terminator applicable to and befitting the standard resistance required for applications used in the industry today. The standard interfaces will assume a standard 50 ohm resistance.

However, the interface be able to connect devices, chips and systems which have different operational voltages. The first circuit 25 may be operating at a different voltages then the second circuit 24. Generally, the terminating circuit 21 and the second circuit 24 will be constructed very close together physically in the same electronic system whereas the first circuit 25 communicating over net 20 may be remotely located in the same electronic system or even external to the electronic system in which the terminating circuit and the second circuit 24 are located. It is preferred that the electronic systems in which the circuits 21, 25 and 24 are located are digital systems such as those used for computer systems, and the network 20 will be used for connecting different components such as different processor or memory buses or data links or other different electronic components between two computer systems or other electronic systems which need to communicate data as digitized electrical signals or electrical signals.

The terminator circuit 21 illustrated for the preferred embodiment in FIG. 2 comprises a reference circuit 30 and an input circuit 31 for connecting the first driving circuit 25 to the second driven input circuit 24. The reference circuit 30 generates two reference voltages on a first node 14 and second node 15. These two voltages can be produced independently on separate paths or on a single path with series connected devices as shown in FIG. 2 as a preferred embodiment.

The two voltages are produced on a single reference path as shown in FIG. 2 by the reference circuit 30 which comprises a series connected first resistor 51 from the upper level power supply 11 to second node 15, and from second node 15 it is connected to the gate and drain of an nfet 52 device. The source of the nfet 52 device is connected to a third node 100. The tuned reference voltage is measured at the third node 100 is then connected to the source of a pfet 53 device. The gate of the pfet 53 device is tied to its drain and both the drain and gate of the pfet 53 device are connected to the first node 14. This first node 14 is connected to a second resistor 54 and the other end of resistor 54 is connected to the lower level power supply 12, which is ground in this case. It is important to note that in accordance with the invention the third node 100 is tuned to a voltage level equal to the center of the incoming voltage swing between the logic '1' and '0' voltage levels between the upper level power supply and the lower level power supply. Hereinafter, this center voltage will be called Vcenter. This will set second node 15 at a voltage which is a level v2t above the Vcenter tuned level and first node 14 at a voltage which is a level vlt below Vcenter. Irrespective of whether the two voltage levels are generated independently or as described for the preferred embodiment, the two levels are supplied on separate paths from the first and second nodes respectively to the terminator input circuit 31. The second node 15 having a voltage level above the tuned voltage reference level is connected to the gate of a terminator input circuit nfet 16 device. The first node 14 having a voltage level below the tuned voltage reference level is connected to the gate of a terminator input circuit pfet 17. After arriving at the mirrored devices of the terminator input circuit 21, the voltages on both sides of the tuned reference voltages are combined by the terminator input circuit to control value of the signal of the terminator pad 10. The sources of a terminator input circuit nfet 16 device and pfet 17 are tied together to the network input terminal 10 or PAD. Via this pad, the terminator is connected to net 20, where the terminator then connects to the driving circuit 25 as stated in the beginning to the network driven input circuit 24.

In accordance with the preferred embodiment of the invention in the triple wells SOI technology, the floating bodies of the pfet devices can create a shift in the "turn-on" voltages which is not desirable. Accordingly, in the preferred embodiment, in accedence with the invention, the body of nfet 52 and nfet 16 are connected to the lower level power supply 12 or ground, and the body of pfet 53 and pfet 15 are connected to the upper (or higher) level power supply 11 or vdd.

The operation of this terminal is as follows: when the terminal 10 is driven to rise above the Vcenter, the gate to source voltage in pfet 17 is driven to below tuned voltage vt and lower still more, and the gate starts to turn on and conduct current to the lower level power supply 12 or ground, whereas gate to source of nfet 16 is below tuned voltage vt and therefore no conduction, no current will flow in nfet 16 to the upper level power supply 11 or VDD. On the other hand, when terminal 10 falls below Vcenter, the gate to source voltage of nfet 16 is above tuned voltage vt and turns on to conduct current to the upper level power supply 11 or power supply VDD. Now the pfet 17 is off since the gate-to-source voltage is above tuned voltage vt.

In accordance with this preferred embodiment the back to back gate to drain connected configuration is provided with nfet 52 and pfet 53 in the reference circuit. This tracks to the terminator's corresponding mirror devices, nfet 16 and pfet 17, and therefore controls each of their turn on voltages, so that no excessive through current in nfet 16 and pfet 17 will occur. Furthermore, at this logic state, one of the devices will be off and reduce the power requirements of the terminator network.

The results of the small signal terminator network as constructed according to the present embodiment are shown in the Figures discussed below. The center of the input voltage swing is at vdd/2 for this illustration. Other input voltage swings also can be designed by changing the resistors.

Figure 3:
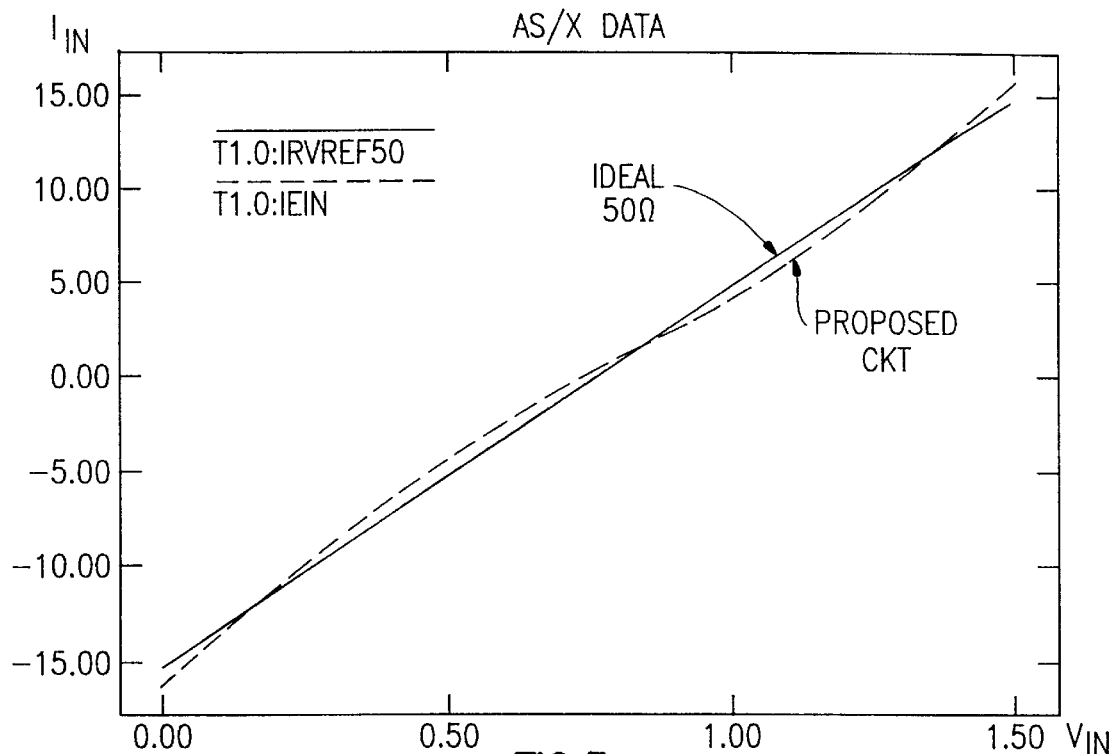
FIG. 3 is a graph having two curves depicting input currents as a function of the input voltages for the CMOS small signal terminator network constructed according to the present invention and an ideal 50 ohm terminator.

FIG. 3 is a graph having two curves depicting input currents as a function of the input voltages for the CMOS small signal terminator network constructed according to the present invention approximating an ideal 50 ohm split resistor terminator. As shown the impedance of the present invention can be match very closely to the ideal 50 ohm resistor terminator.

Figure 4:
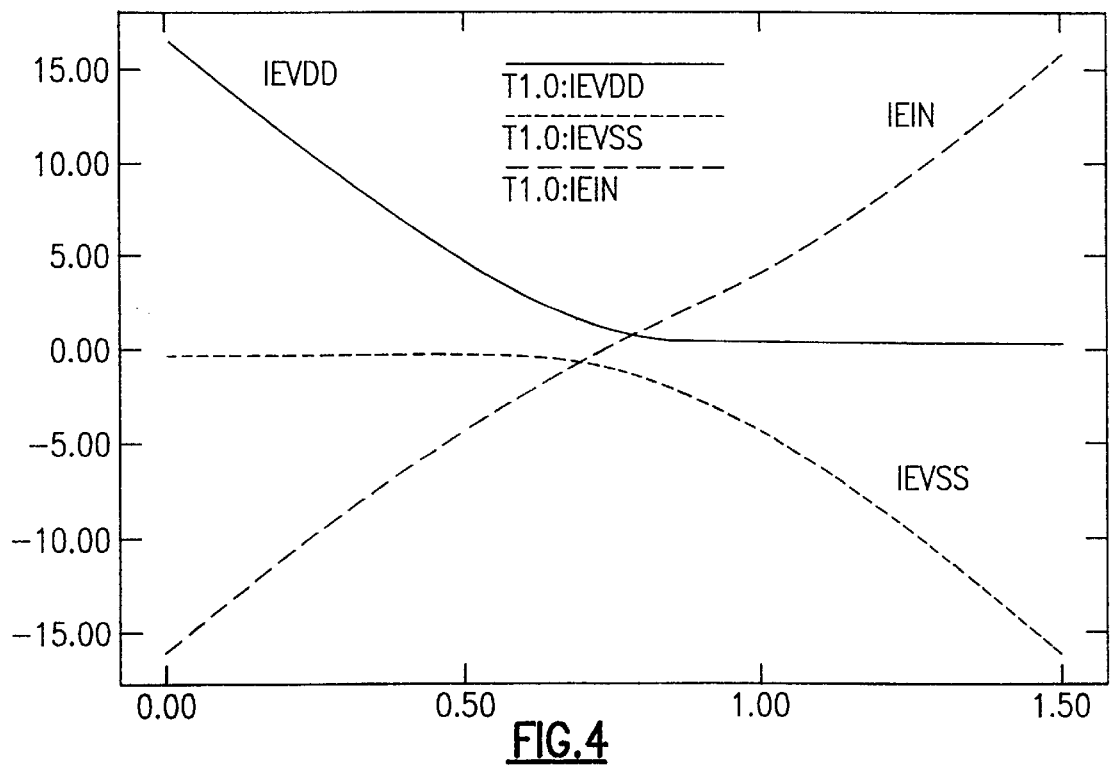
FIG. 4 is a graph having curves depicting the input current as a function of the input voltages for the CMOS small signal terminator constructed according to the present invention and curves of the upper and lower power supply currents as a function of the input voltage.

FIG. 4 is a graph having curves depicting the input current as a function of the input voltages for the CMOS small signal terminator constructed according to the present invention and curves of the upper and lower power supply currents as a function of the input voltage. The input current at the upper half cycle of the input voltage is directed to flow into the lower power supply, and current of the lower half cycle are directed to flow out from the upper power supply. Other than the bias current, there is no through current from the upper to the lower power supplies.

Figure 5:
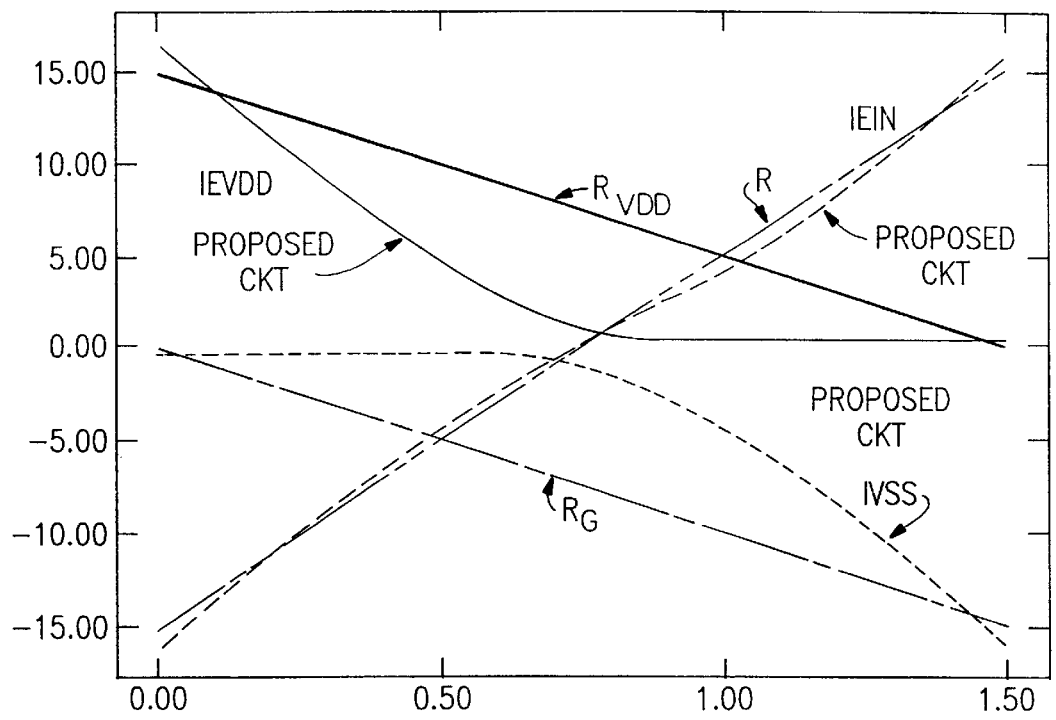
FIG. 5 is a graph having curves depicting the input current as a function of the input voltages for the CMOS small signal terminator constructed according to the present invention and curves of its currents to the upper and lower power supplies as a function of the input voltages. Also having curves of the corresponding input current, and the currents to the upper and lower power supplies for an split resistor terminator as in the illustrated FIG. 1 prior art.

FIG. 5 is a graph having curves depicting the input current as a function of the input voltages for the CMOS small signal terminator constructed according to the present invention and curves of its currents to the upper and lower power supplies as a function of the input voltages. Also FIG. 5 has curves of the corresponding input current, and the currents to the upper and lower power supplies for an split resistor terminator as in the illustration of prior art in FIG. 1. This shows the large difference in the power supply currents at and near the center of the swing between the illustrated prior art and the present invention.

Figure 6:
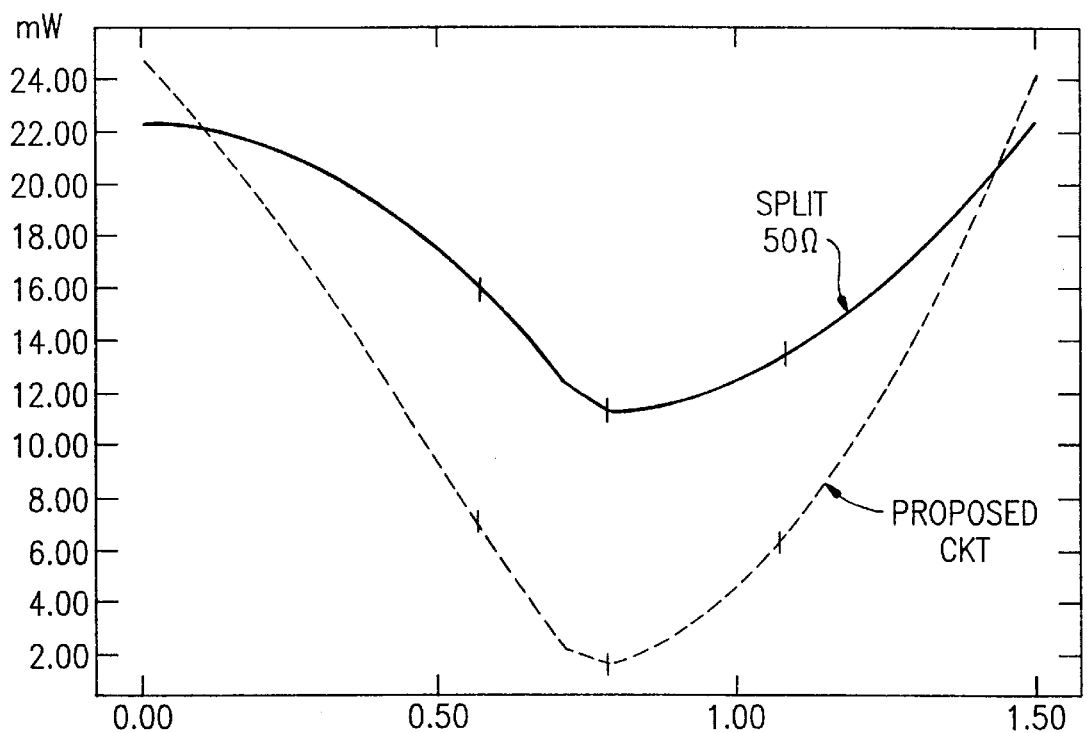
FIG. 6 is a graph having curves of the power consumption as a function of input voltages for the CMOS small signal terminator constructed according to the present invention and the power consumption of a split resistor as in FIG. 1.

FIG. 6 is a graph having curves of the power consumption as a function of input voltages for the CMOS small signal terminator constructed according to the present invention and the power consumption of a split resistor as in the illustrated prior art.

This shows the power which the prior art consumes is a lot more then the present invention in small signal applications. In terms of ESD protection, when the circuit described in the present embodiment of the invention is powered up, the circuit has a low resistance path to one of the power supplies depending on the input voltage level. If the input terminal voltage moves more than about 0.7 volts outside the upper or lower power supplies, the parasitic diodes and the parasitic bipolar transistor in the pfet 17 and nfet 16 also turn on to further reduce the input impedance, hence improving the performance of the ESD protection. This performance is so effective that an additional ESD protection device is not necessary to protect this circuit or the input/output circuit connected to this terminal there after. The parasitic elements in the pfet 17 and nfet 16 mirror devices are active even when the devices are not powered which provides significant ESD protection during handing of the device. The implementation shown results in a clean signal on network 20 with no or minimum reflection and noise generated in the system. This provides a network in which a fast, solid, clean and reliable small swing can be obtained for point to point nets as well as for a cleaner multiple drop net. This implementation provide the fastest transmission of data and signals with much lower power consumption that has been obtained for these applications and allows the use of terminators of this design, as compared to split resistive termination networks such as those using the terminator of FIG. 1.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of making a connection with a terminator circuit for carrying small logic level signals from a network's first circuit to a network's second circuit in which a network's input terminal connects a terminator circuit to the network's second circuit to act as a terminator on the data line passing data from said first circuit to said second circuit, comprising the steps of:

establishing a tuned voltage level equal to the center of an incoming voltage swing between a logic '1' level and a logic '0' level in a terminator reference circuit and establishing a first upper and a second lower reference voltage level above and below said tuned voltage level respectively for a terminator reference circuit of said terminator circuit which is coupled to a terminator input circuit in said terminator circuit, and supplying on separate paths from a first node and a second node respectively of said terminator reference circuit said first upper and second lower reference voltage levels respectively to to mirrored pfet and nfet devices of said terminator input circuit, whereby the second node (15) having a voltage level above the tuned voltage reference level is connected to the gate of a terminator input circuit nfet (16) device, and the first node (14) having a voltage level below the tuned voltage reference level is connected to the gate of a terminator input circuit pfet (17) whereby mirrored nfet and pfet devices of the terminator input circuit (21) are respectively coupled to a network input terminal to then connect a network driving circuit to a network driven input circuit (24) ; and wherein the bodies of the nfet devices being connected to a lower level power supply, and the bodies of said pfets being connected to an upper level power supply.

2. The method of making a connection with a terminator circuit according to claim 1 wherein said terminator reference circuit has back to back gate to drain connected control nfet and pfet devices in the reference circuit controls the voltage level supplied to corresponding mirror nfet and pfet devices of said terminator input circuit to control each of the the mirror nfet and pfet device's turn on voltages.

3. The method of making a connection with a terminator circuit according to claim 1 wherein the network input terminal (10) is driven to rise above the Vcenter, and the gate to source voltage in said mirror pfet (17) device is driven to below tuned voltage (vt) and lower still more, and the gate in said mirror pfet device starts to turn on and conduct current to the lower level power supply (12) or ground, whereas the gate to source of said mirror nfet (16) device is below tuned voltage (vt) and no current flows in said mirror nfet (16) device to the upper level power supply (11).

4. The method of making a connection with a terminator circuit according to claim 1 wherein input currents to the circuit are a function of the input voltages for a CMOS small signal terminator network having and impedence approximating an ideal predetermined ohm split resistor terminator and the impedence is adjustable to match very closely to the ideal predetermined ohm resistor terminator.

5. The method of making a connection with a terminator circuit according to claim 1 wherein the upper and lower power supply currents of the circuits are a function of the input voltage and the input current at the upper half cycle of the input voltage is directed to flow into the lower power supply, and current of the lower half cycle are directed to flow out from the upper power supply, and wherein, other than a bias current, there is no through current from the upper to the lower power supplies.

6. The method of making a connection with a terminator circuit according to claim 1 wherein when the terminator circuit is powered up, the terminator circuit has a low resistance path to one of the power supplies depending on the input voltage level and if the input terminal voltage moves a fractional voltage outside the upper or lower power supplies, parasitic diodes and the parasitic bipolar transistor in said mirror pfet (17) and nfet (16) devices also turn on to further reduce the input impedance, improving the performance of the ESD protection.

7. The method of making a connection with a terminator circuit according to claim 1 wherein parasitic diodes and a parasitic bipolar transistor in the pfet (17) and nfet (16) mirror devices are active even when the mirror devices are not powered to provide ESD (electrostatic discharge) protection during handing of the device.

8. A method of making a connection with a terminator circuit for carrying small logic level signals from a network's first circuit to a network's second circuit in which a network's input terminal connects a terminator circuit to the network's second circuit to act as a terminator on the data line passing data from said first circuit to said second circuit, comprising the steps of:

establishing a tuned voltage level equal to the center of an incoming voltage swing between a logic '1' level and a logic '0' level in a terminator reference circuit and establishing a first upper and a second lower reference voltage level above and below said tuned voltage level respectively for a terminator reference circuit of said terminator circuit which is coupled to a terminator input circuit in said terminator circuit, and supplying on separate paths from a first node and a second node respectively of said terminator reference circuit said first upper and second lower reference voltage levels respectively to to mirrored pfet and nfet devices of said terminator input circuit, whereby the second node (15) having a voltage level above the tuned voltage reference level is connected to the gate of a terminator input circuit nfet (16) device, and the first node (14) having a voltage level below the tuned voltage reference level is connected to the gate of a terminator input circuit pfet (17) whereby mirrored nfet and pfet devices of the terminator input circuit (21) are respectively coupled to a network input terminal to then connect a network driving circuit to a network driven input circuit (24); and wherein the network input terminal (10) falls below tuned voltage Vcenter, and the gate to source voltage of said mirror nfet (16) device is above tuned voltage (vt) it turns on to conduct current to the upper level power supply (11) and the mirror pfet (17) device is off while the gate-to-source voltage is above tuned voltage (vt).

9. The method of making a connection with a terminator circuit according to claim 8 wherein said terminator reference circuit has back to back gate to drain connected control nfet and pfet devices in the reference circuit controls the voltage level supplied to corresponding mirror nfet and pfet devices of said terminator input circuit to control each of the the mirror nfet and pfet device's turn on voltages.

10. The method of making a connection with a terminator circuit according to claim 8 wherein the network input terminal (10) is driven to rise above the Vcenter, and the gate to source voltage in said mirror pfet (17) device is driven to below tuned voltage (vt) and lower still more, and the gate in said mirror pfet device starts to turn on and conduct current to the lower level power supply (12) or ground, whereas the gate to source of said mirror nfet (16) device is below tuned voltage (vt) and no current flows in said mirror nfet (16) device to the upper level power supply (11).

11. The method of making a connection with a terminator circuit according to claim 8 wherein input currents to the circuit are a function of the input voltages for a CMOS small signal terminator network having and impedence approximating an ideal predetermined ohm split resistor terminator and the impedence is adjustable to match very closely to the ideal predetermined ohm resistor terminator.

12. The method of making a connection with a terminator circuit according to claim 8 wherein the upper and lower power supply currents of the circuits are a function of the input voltage and the input current at the upper half cycle of the input voltage is directed to flow into the lower power supply, and current of the lower half cycle are directed to flow out from the upper power supply, and wherein, other than a bias current, there is no through current from the upper to the lower power supplies.

13. The method of making a connection with a terminator circuit according to claim 8 wherein when the terminator circuit is powered up, the terminator circuit has a low resistance path to one of the power supplies depending on the input voltage level and if the input terminal voltage moves a fractional voltage outside the upper or lower power supplies, parasitic diodes and the parasitic bipolar transistor in said mirror pfet (17) and nfet (16) devices also turn on to further reduce the input impedance, improving the performance of the ESD protection.

14. The method of making a connection with a terminator circuit according to claim 8 wherein parasitic diodes and a parasitic bipolar transistor in the pfet (17) and nfet (16) mirror devices are active even when the mirror devices are not powered to provide ESD (electrostatic discharge) protection during handing of the device.

* * * * *